(12) United States Patent
Coates et al.

(10) Patent No.: US 6,873,471 B2
(45) Date of Patent: Mar. 29, 2005

(54) EYEPIECE FOR VIEWING A FLAT IMAGE

(75) Inventors: Nicholas Richard Coates, Crowborough (GB); Roger Brian Huxford, Burgess Hill (GB)

(73) Assignee: SEOS Limited, West Sussex (GB)

( * ) Notice: Subject to any disclaimer, the term of this patent is extended or adjusted under 35 U.S.C. 154(b) by 0 days.

(21) Appl. No.: 10/417,387

(22) Filed: Apr. 16, 2003

(65) Prior Publication Data

US 2003/0202253 A1 Oct. 30, 2003

(30) Foreign Application Priority Data

Apr. 24, 2002 (GB) .............................................. 0209362

(51) Int. Cl.⁷ .......................... G02B 25/04; G02B 17/08
(52) U.S. Cl. ...................................... 359/643; 359/727
(58) Field of Search .............................. 359/726–736, 359/643–647, 629–639; 345/7, 8

(56) References Cited

U.S. PATENT DOCUMENTS

| | | | |
|---|---|---|---|
| 5,539,578 A | | 7/1996 | Togino et al. .............. 359/630 |
| 5,644,436 A | * | 7/1997 | Togino et al. .............. 359/731 |
| 5,734,505 A | | 3/1998 | Togino et al. .............. 359/631 |
| 5,801,885 A | | 9/1998 | Togino ........................ 359/630 |
| 5,875,056 A | | 2/1999 | Takahashi ................... 359/633 |
| 5,940,218 A | | 8/1999 | Takahashi ................... 359/630 |
| 6,014,261 A | | 1/2000 | Takahashi ................... 359/633 |
| 6,018,423 A | | 1/2000 | Takahashi ................... 359/633 |

FOREIGN PATENT DOCUMENTS

GB           228354           2/1925

* cited by examiner

Primary Examiner—Scott J. Sugarman
Assistant Examiner—Deborah Raizen
(74) Attorney, Agent, or Firm—Iandiorio & Teska

(57) ABSTRACT

An eyepiece (2) for viewing a flat image, which eyepiece (2) has a wide field of view and which eyepiece (2) comprises a cemented doublet of reflecting and refracting optical components, the reflecting and refracting optical components being such that they are each of a different refractive index whereby chromatic aberrations and spherical aberrations are reduced.

10 Claims, 2 Drawing Sheets

EYEPIECE FOR VIEWING A FLAT IMAGE

FIELD OF THE INVENTION

This invention relates to an eyepiece for viewing a flat image. The flat image may form part of a flat panel display such for example as a rear projection screen, an electronic micro display, or a real aerial image formed by another optical system.

BACKGROUND OF THE INVENTION

Eyepieces are known which include an optical arrangement known as a pancake window. These known eyepieces are used to view flat panel displays but they only have a limited field of view.

In any eyepiece, there is a zone in space where the eye pupil can be placed in order to view the image. The zone is defined by the distance between the last face of the last optical element, called the eye-relief, and an area at this distance where the image can be seen. If the eye pupil is moved laterally outside this area, some optical systems exhibit an exit pupil where a sudden transition from image to darkness would be observed. Other systems have a less clear transition where, as the eye is moved outside the design viewing area, the image is observed to lose brightness and/or resolution.

In applications that require a wide field of view, a small viewing area is undesirable because the eye may swivel in order to vary the point of regard within the view. In addition, if the optical system is head mounted as opposed to hand held, it is not readily possible to compensate for this eye movement by moving the eyepiece relative to the eye. The situation is further complicated by the fact that most methods of mounting the display on the head permit some relative movement. With conventional eyepiece design, the need for a wide field of view, reasonable eye-relief, a large viewing area, and a compact lightweight eyepiece are incompatible.

When an eyepiece is used in a head mounted display, the head mounted display forms a means for interacting with a three dimensional virtual environment. In order to form the virtual environment, head tracking devices are used to monitor the position and orientation of the user's head, information from which is fed back to an image generator such that the image displayed corresponds to the position and the orientation within a computer model. Head mounted displays with a large field of view give the impression of being in the image, as opposed to watching on a screen. Optical solutions for the eyepiece tend to trade the desired field of view for viewing area size. Moreover, the eye relief can only be scaled up by increasing the size and therefore the weight of the eyepiece. Still further, refractive eyepieces are complicated, requiring many large and heavy elements, positioned in some cases well in front of the eye, which mitigates against an ideal weight distribution.

The desired total field of view for a head mounted display is 120°×67°. Known head mounted displays that have been designed to have a large field of view have been both very heavy and very expensive. The head mounted displays are usually unbalanced, with most of the weight being to the front of the user's head. The excessive weight of the known head mounted displays has made them uncomfortable to use and inefficient. This is because, in order to work effectively, the eyepiece must be in a fixed location relative to the user. The excessive weight of the head mounted display means that inertia is substantial and tends to cause the head mounted display to lag when the user's head makes an angular acceleration, and to overshoot as the user's head decelerates.

SUMMARY OF THE INVENTION

It is an aim of the present invention to provide an eyepiece which reduces or eliminates the above mentioned problems.

Accordingly, the present invention provides an eyepiece for viewing a flat image, which eyepiece has a wide field of view and which eyepiece comprises a cemented component of reflecting and refracting optical components, the reflecting and refracting optical components being such that they are each of a different refractive index whereby chromatic aberrations and spherical aberrations are reduced, and the cemented component comprising six of the reflecting and refracting optical components cemented together by an optical adhesive.

The eyepiece of the present invention may be compact and lightweight. The eyepiece may have a wide field of view for observing flat panel displays which can be in the form of a rear projection screen, an electronic micro display, or a real aerial image formed by another optical system.

The eyepiece of the present invention may afford a viewing area at the desired eye relief that is greater than the maximum eye pupil of 8 mm, allowing the pupil to swivel whilst staying within the viewing area.

The six reflecting and refracting components of the cemented doublet may comprise a semi-reflecting mirror surface for providing the majority of the focusing power of the eyepiece, two refracting surfaces for providing the remainder of the focusing power of the eyepiece, two quarter wave retarders and a polarising mirror, the two quarter wave retarders and the polarising mirror being such as to control the light path through the cemented component.

The eyepiece may include a seventh optical component in the form of a single planoconvex lens.

The two refracting surfaces may be two convex refracting surfaces.

The eyepiece may be one in which a low-index low-dispersion lens is positioned on one side of the semi-reflecting mirror surface, and in which a high-index high-dispersion lens is positioned on the other side of the semi-reflecting mirror surface. The low-index low-dispersion lens is preferably made of glass, and the high-index high-dispersion lens is preferably made of glass.

The present invention also provides viewing apparatus comprising the eyepiece of the invention. The viewing apparatus may be for viewing a flat panel display.

The viewing apparatus may form part of a head mounted display.

The viewing apparatus may have one of the eyepieces for each eye.

The viewing apparatus may be used to view a rear projection screen, an electronic micro display, a micro-emissive display panel, or real aerial image formed by another optical system. The micro-emissive display panel may be an organic light emitting diode display panel, an active matrix electroluminescent display panel, a field emission display panel, a carbon nanotube display panel, a vacuum fluorescent display panel, or any other desired and appropriate type of micro-emissive display panel.

BRIEF DESCRIPTION OF THE DRAWINGS

An embodiment of the invention will now be described solely by way of example and with reference to the accompanying drawings in which.

DETAILED DESCRIPTION OF THE DRAWINGS

Figure 1:
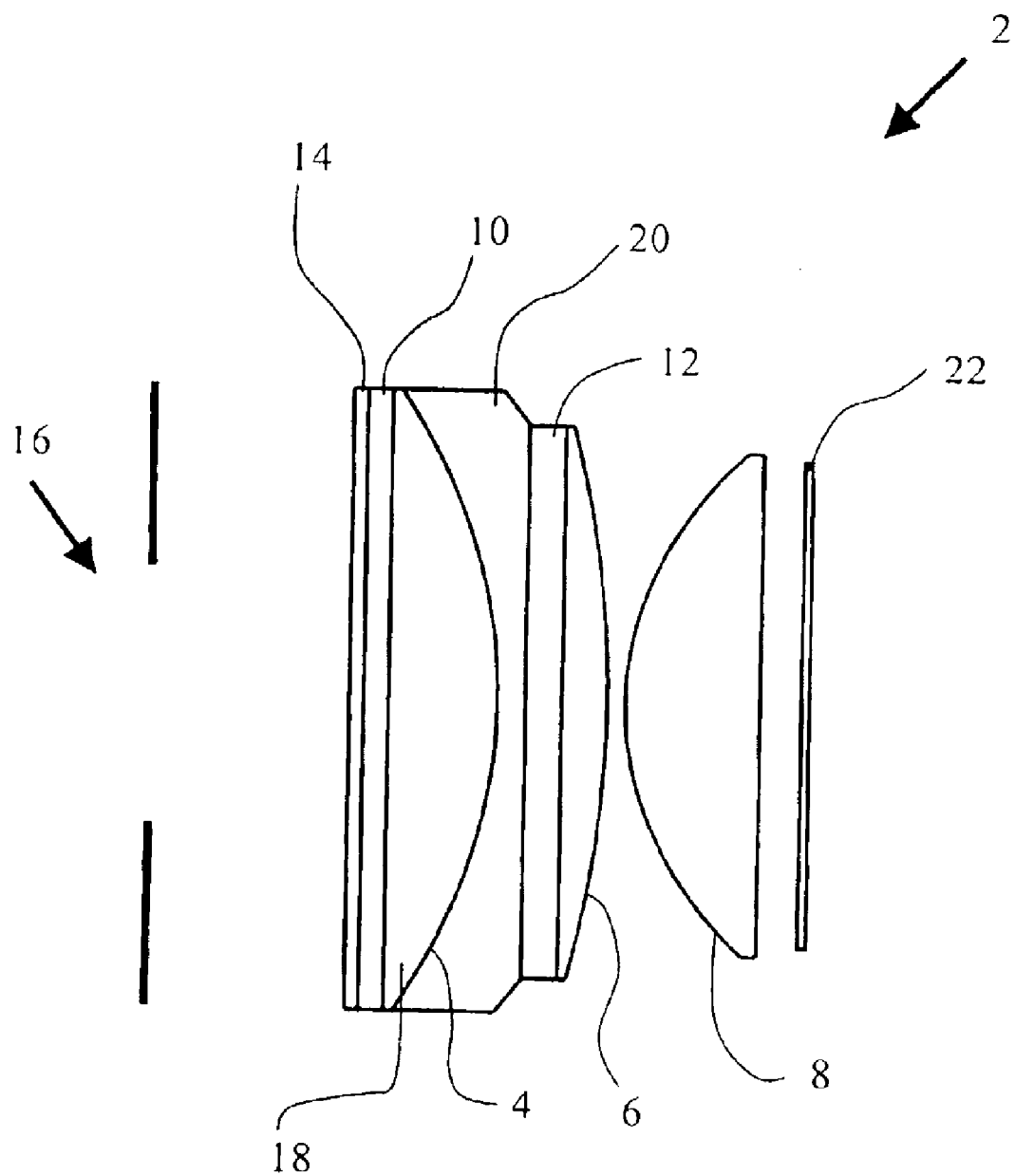
FIG. 1 shows an eyepiece.

Referring to FIG. 1, there is shown an eyepiece 2 which is based on a known pancake window. The eyepiece 2 may be regarded as a straight-through on-axis mirror collimator which uses polarisation to suppress transmission orders that are not desired. In the original known pancake window, the display source was a spherical screen, the reflected image of which was rotationally symmetrical about the eye. The maximum field of view for this known arrangement was approximately 88°, limited by the interference of the screen with the surface of the spherical beam splitter. It is known that if the pancake window is made from solid glass, then the field of view can be increased. It is also desirable to use a flat panel as the display source. Known eyepieces when used with a flat panel as the display source have only had limited field of view per channel.

Figure 2:
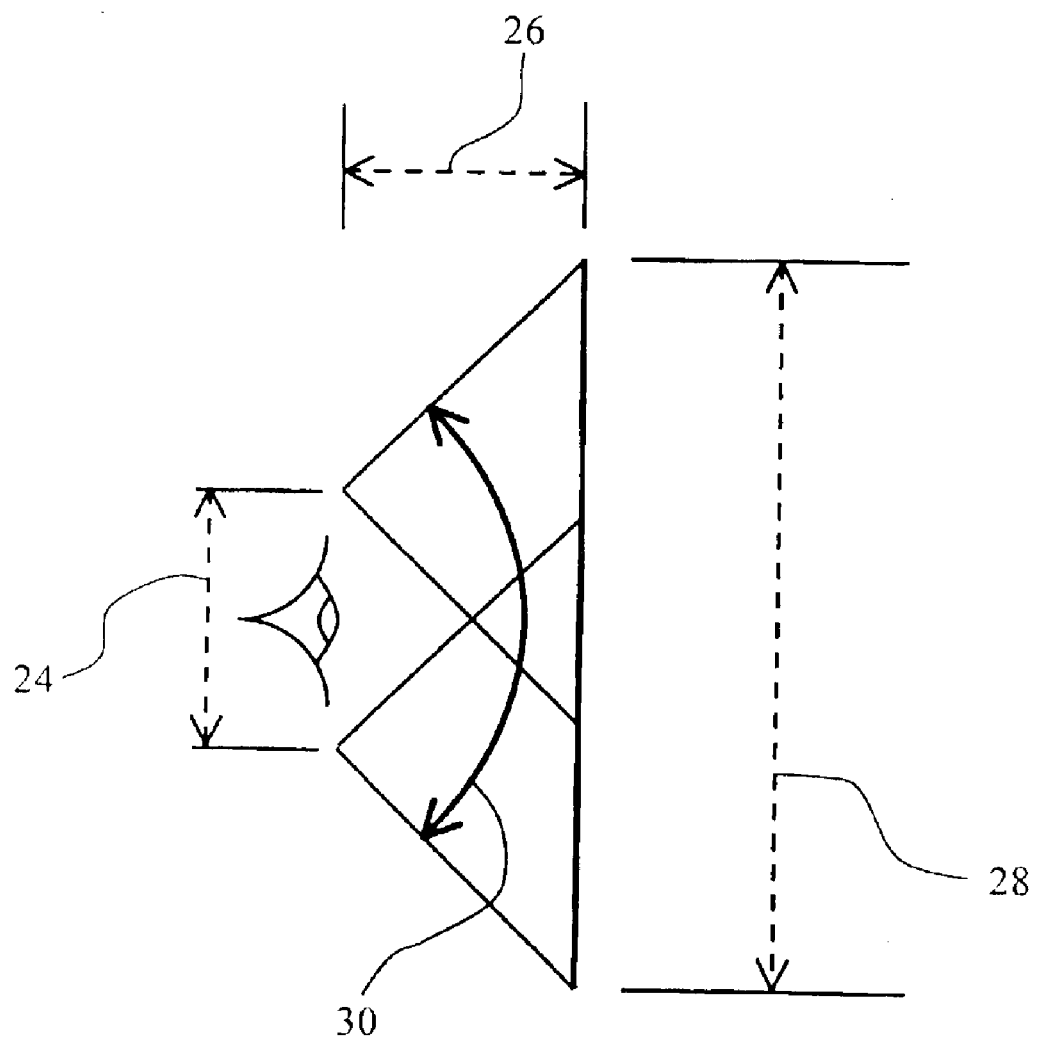
FIG. 2 shows the relationship of eye relief to an exit pupil, a viewing area and the field of view.

FIG. 2 shows the relationship of the eye relief 26 to the exit pupil 28, the viewing area 24 and the field of view 30. It can be seen that as the eye relief 26 increases, the exit pupil 28 must increase in order to maintain the field of view 30. Therefore as the eye relief increases, the size and therefore the weight of the eyepiece must increase.

In order to operate satisfactory, the eyepiece 2 of the present invention needs to be of a design that enables it to be placed close to the eye, closer than the minimum eye relief to facilitate the wearing of spectacles which is approximately 25 mm. The field of view of the eyepiece can be represented by a truncated cone, the area of the truncated end representing the desired viewing area. The exit pupil of the optics must fit across the wide end of the cone at the desired eye relief. As the eye relief is increased, the eyepiece must be scaled in all three dimensions. Therefore any additional eye relief will increase the weight of the eyepiece. This increase in weight of the eyepiece is proportional to the cube of the eye relief.

In order to obtain a large field of view when using a flat panel display, a catadioptric design incorporating chromatic correction is used. The eyepiece 2 is therefore designed for use without spectacles. The eye relief is less than 25 mm, enabling the weight to be reduced. The eyepiece 2 is however adjustable through +4 or −4 diopters, catering for users with both myopia and hypermetropia. The user is however still able to use contact lenses.

As shown in FIG. 1, the eyepiece 2 comprises seven components, six of which are cemented together in a preferred embodiment in order to form a solid optical assembly, plus a single planoconvex lens. The eyepiece 2 comprises a semi-reflecting mirror surface 4, refracting surfaces 6, 8, quarter wave retarders 10, 12 and a polarising mirror 14. With the observer's eye positioned at a viewing area 16, the semi-reflecting mirror surface 4 provides most of the focusing power of the eyepiece 2. The remainder of the focusing power of the eyepiece 2 comes from the refracting surfaces 6, 8. The light path through the eyepiece 2 is made to follow the desired path by the action of the quarter wave retarders 10, 12 and the polarising mirror 14. The quarter wave retarders 10, 12 have close to the same retardation across the visible spectrum. The polarising mirror 14 could also be made with a combination of a beamsplitter and a polarising filter.

In order to make the eyepiece 2 compact and yet still achieve a wide field of view, the rotational symmetry about the eye is abandoned as the viewing area 16 has to move closer to the semi-reflecting mirror surface 4. This means that the optical aberrations across the field of view are not constant due to the introduction of astigmatism. However, this is substantially corrected by the two positive power refracting surfaces 6 and 8.

The field of view is further increased by making the eyepiece 2 from solid glass. However this introduces significant chromatic aberration, approximately 14 arc minutes, over the visual spectrum. By using different glass materials either side of the semi-reflecting surface 4, the chromatic aberrations can be reduced by about 50% which is much more acceptable to the observer. Different glass materials on either side of semi-reflecting surface take the form of an achromatic doublet where a lens 18 is a low index low dispersion glass lens, whilst a lens 20 is a high index high dispersion glass lens.

Approximately 57% of the focusing of the eyepiece 2 is obtained from the semi-reflecting mirror surface 4, with the refracting surface 6 contributing an additional 27%. These two surfaces 4, 6 also account for the majority of the spherical aberration in the eyepiece 2. About half of the spherical aberration is corrected by the return passage of the light ray path through the semi-reflecting mirror surface 4. This semi-reflecting mirror surface 4 mimics the cemented surface of a doublet because of the low and high refractive index materials used in the lenses 18 and 20 respectively, on either side of the concave mirror surface 4. Over the central 14 mm of the eyepiece exit pupil diameter, the residual spherical aberration is equivalent to an image blur, which is less than the threshold acuity (1.3 arc minutes) of a 3 mm diameter eye pupil. For larger eyepiece exit pupil diameters, the image blur is equivalent to 8 or 10 arc minutes, which is similar to the acuity of the average eye with a 7 mm pupil diameter. To achieve better spherical aberration correction, a more complex and therefore heavier eyepiece assembly would be required, whereas the eyepiece shown in FIG. 1 gives a performance which is compatible to the threshold acuity of the average eye over an interocular range of 53–75 mm.

Unlike positive powered refracting surfaces, the positive power semi-reflecting mirror surface 4 over-corrects the field curvature of the eyepiece 2 to such an extent that the image surface or screen 22 would be significantly convex towards the observer. The two convex refracting surfaces 6, 8 are used to counteract the over-correction of the field curvature such that a flat screen can be comfortable to view. Also, the two convex refracting surfaces 6, 8 give additional positive focusing power to the eyepiece 2, and provide some astigmatism correction.

It is to be appreciated that the embodiment of the invention described above with reference to the accompanying drawings has been given by way of example only and that modifications may be effected.

What is claimed is:

1. An eyepiece for viewing a flat image, which eyepiece has a wide field of view and which eyepiece comprises a cemented component of reflecting and refracting optical components, the reflecting and refracting optical components being such that they are each of a different refractive index whereby chromatic aberrations and spherical aberrations are reduced, and the cemented component comprising six of the reflecting and refracting optical components cemented together by an optical adhesive.

2. An eyepiece according to claim 1 in which the six reflecting and refracting optical components of the cemented component are a semi-reflecting mirror surface for providing the majority of the focusing power of the eyepiece, two refracting surfaces for providing the remainder of the focusing power of the eyepiece, two quarter wave retarders, and a polarising mirror, the two quarter wave retarders and the polarising mirror being such as to control the light path through the cemented component.

3. An eyepiece accordingly to claim 1 and including a seventh optical component in the form of a single plano-convex lens.

4. An eyepiece according to claim 2 in which the two refracting surfaces are two convex refracting surfaces.

5. An eyepiece according to claim 2 in which a low-index low-dispersion lens is positioned on one side of the semi-reflecting mirror surface, and in which a high-index high-dispersion lens is positioned on the other side of the semi-reflecting mirror surface.

6. An eyepiece according to claim 5 in which the low-index low-dispersion lens is made of glass, and in which the high-index, high-dispersion lens is made of glass.

7. Viewing apparatus comprising the eyepiece according to claim 1.

8. Viewing apparatus according to claim 7 and for viewing a flat panel display.

9. Viewing apparatus according to claim 8 in which the viewing apparatus is part of a head mounted display.

10. Viewing apparatus according to claim 7 and having one of the eyepieces for each eye.

* * * * *